United States Patent [19]

Okuda

[11] Patent Number: 5,307,853
[45] Date of Patent: May 3, 1994

[54] TIRE BEAD

[75] Inventor: Takaaki Okuda, Fukushima, Japan

[73] Assignee: Sumitomo Rubber Industries, Ltd., Hyogo, Japan

[21] Appl. No.: 895,118

[22] Filed: Jun. 8, 1992

Related U.S. Application Data

[62] Division of Ser. No. 791,058, Nov. 12, 1991.

[30] Foreign Application Priority Data

Nov. 16, 1990 [JP] Japan .................. 2-308702
Nov. 16, 1990 [JP] Japan .................. 2-308703

[51] Int. Cl.⁵ ............................ B60C 15/04
[52] U.S. Cl. ..................... 152/540; 245/1.5; 428/375
[58] Field of Search ............ 152/539, 540; 156/136; 245/1.5; 428/365, 369-371, 375, 396

[56] References Cited

U.S. PATENT DOCUMENTS

| | | | |
|---|---|---|---|
| 3,556,922 | 1/1971 | Green et al. | 428/375 |
| 3,942,574 | 3/1976 | Bantz | 152/540 |
| 4,436,132 | 3/1984 | Cesar et al. | 156/136 |
| 4,823,857 | 4/1989 | Orjela et al. | 152/540 |
| 4,876,143 | 10/1989 | Sugita et al. | 428/375 |

FOREIGN PATENT DOCUMENTS 56-43010 4/1981 Japan .

Primary Examiner—Michael W. Ball
Assistant Examiner—Nancy T. Krawczyk
Attorney, Agent, or Firm—Birch, Stewart, Kolasch & Birch

[57] ABSTRACT

A tire bead including steel wire cords and aromatic polyamide wire cords, the steel wire cords being placed inside a cross section of the tire bead and the aromatic polyamide wire cords being placed on the outside of the bead cross section.

1 Claim, 3 Drawing Sheets

TIRE BEAD

This application is a divisional of U.S. application Ser. No. 07/791,058, filed Nov. 12, 1991.

BACKGROUND OF THE INVENTION Field of the Invention

The present invention relates to tire beads which are provided at the radially inner ends of the sidewalls of a tire.

A conventional pneumatic tire comprises an annular tread, a pair of sidewalls extending radially inward from opposite ends of the tread, a bead portion that is formed at the radially inner end of each sidewall and which is provided with an annular bead in its interior, and a carcass that is composed of a number of parallel carcass cords made of either an organic or inorganic material and that passes through the tread and the sidewalls in such a way that each end of the carcass is folded towards the outside around the bead to be held in position.

The beads as they are used in an inflated pneumatic tire have the basic capability of supporting the terminal ends of the carcass cords as they tend to expand outwardly under the inflation pressure, to thereby accommodate the tension of the carcass cords. To fulfill these functions, the beads are required to have not only sufficient strength to withstand an applied great tension and also the great rigidity that is necessary to retain the tire on a wheel rim while maintaining a sufficient dimensional precision on the inner periphery of the bead portion to insure good fit to the rim.

In order to satisfy these strength and rigidity requirements, a plurality of high-modulus steel wires have been used as conventional beads.

However, such conventional beads that comprise more than one steel wire have had the problem that their weight accounts for about 5% of the tire weight, which is one of the obstacles to the objective of realizing lighter tires that is gaining increasing importance these days when vehicles are required to have better performance.

Another problem with the conventional beads is that the steel wires which constitute the beads contact the Carcass cords to potentially cause a breakage of the latter.

Thus, with a view to reducing the weight of tires, several proposals have been made that are based on the use of aromatic polyamide cords as bead forming wires. For example, Examined Japanese Patent Publication No. 33244/1981 proposes the use of steel wire cords in combination with aromatic polyamide wire cords since beads that are formed of aromatic polyamide wire cords alone have such low rigidity that the tire o is difficult to mount positively on a wheel rim.

Unexamined Published Japanese Patent Application No. 82705/1975 describes a tire in which the beads are formed solely of cords that are made of aromatic polyamide wires. Further, Unexamined Published Japanese Patent Application No. 43010/1981 describes a tire in which the beads are formed of cords that are made of other wire materials than steel such as aromatic polyamides or glass fibers. However, both types of beads are insufficient in strength against compression strain and flexural deformation to be used in practical applications, particularly in truck and bus tires which are to be used with high inflation pressures, and there has been a possibility that the bead's shape will deform during tire manufacture or running.

An object, therefore, of the present invention is to provide a tire bead that uses an aromatic polyamide in part of the bead forming wires to realize a lighter tire.

Another object of the present invention is to provide a tire bead in which the occurrence of broken carcass cords can be prevented.

SUMMARY OF THE INVENTION

The above-stated object of the present invention can be attained by a tire bead that is basically of a type that is embedded in a bead portion formed at the inner end of sidewalls that extend from opposite ends of an annular tread on the outer periphery of a tire, the tire bead comprising steel wire cords and aromatic polyamide wire cords, the steel wire cords being placed inside a cross section of the tire bead whereas the aromatic polyamide wire cords are placed outside the bead cross section.

The tire bead of the present invention which has the construction described above is characterized in that the aromatic polyamide wires have comparable strength to the steel wires and that the former are lighter in weight than the latter. Therefore, this tire bead contributes to the manufacture of a lighter tire without compromising its strength.

In addition, the steel wire cords are placed inside a cross section of the tire bead whereas the soft aromatic polyamide wire cords are placed outside said bead cross section. As a result, the carcass cords in the carcass which is folded towards the outside around the tire bead will not make contact with the steel wire cords, thereby preventing the occurrence of broken carcass cords.

Further, the steel wire cords placed in the center area of the cross section of the bead increase its rigidity by a sufficient amount to prevent it from being deformed.

In addition, the above-stated object of the present invention can be attained by a tire bead that is basically of a type that is embedded in a bead portion formed at the inner end of each of sidewalls that extend from opposite ends of an annular tread on the outer periphery of a tire, the tire bead comprising steel wire cords and aromatic polyamide wire cords, the steel wire cords being arranged parallel to one another to form a layer that alternates with a layer formed by the aromatic polyamide wire cords which are also arranged parallel to one another.

The tire bead of the present invention which has the construction described above is characterized in that the aromatic polyamide wires have comparable strength to the steel wires and that yet the former are lighter in weight than the latter. Therefore, this tire bead contributes to the manufacture of a lighter tire without compromising its strength.

In addition, the layer formed by arranging a plurality of steel wire cords parallel to one another is disposed in such a way that it alternates with the layer formed by arranging a plurality of aromatic polyamide wire cords parallel to one another, and this is not only effective in insuring the rigidity of the tire bead and preventing it from being deformed but also instrumental for facilitating the bead production.

DETAILED DESCRIPTION OF THE PREFERRED EMBODIMENTS

Embodiments of the present invention are described below with reference to the accompanying drawings.

Figure 1:
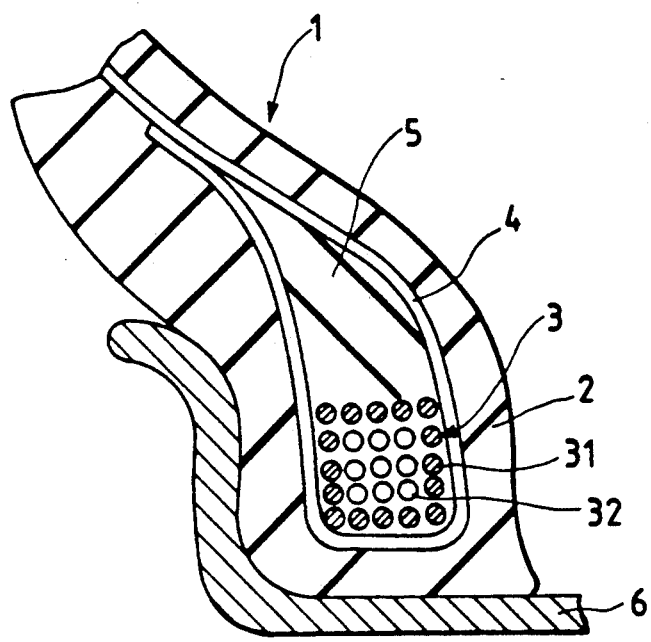
FIG. 1 is a partial cross section of a bead portion according to a first embodiment of the present invention.

FIG. 1 shows in partial cross section a bead portion according to a first embodiment of the present invention. As shown, a sidewall 1 extends from each end of an annular tread (not shown) formed on the outer periphery of a pneumatic tire. A bead portion 2 is formed at the radially inner end of the sidewall 1, and the tire bead indicated by 3 is embedded in annular form within the bead portion 2.

A carcass 4 is provided in such a way that it passes through the annular tread and the sidewall 1 and the end of the carcass 4 is folded towards the outside around the tire bead 3. A bead apex 5 is provided radially outward of the tire bead 3, and the bead portion 2 is fitted on a tire mounting rim 6.

The tire bead 3 is formed of aromatic polyamide wire cords (hereunder referred to as "aramid cords") 31 that are bundled together with steel wire cords (hereunder referred to as "steel cords") 32.

Figure 2:
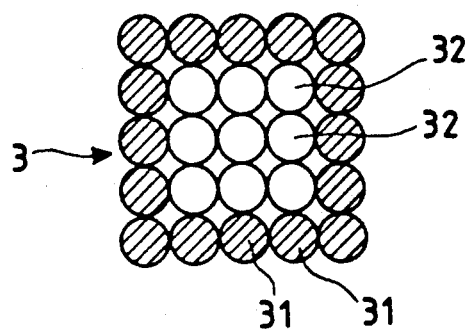
FIG. 2 is an enlarged cross section of the tire bead in the same bead portion.

FIG. 2 is an enlarged cross section of the tire bead 3. As shown, the tire bead 3 is formed in a generally rectangular cross section in such a way that a plurality of steel cords 32 are disposed in the center area, or inside, of the cross section of the tire bead whereas they are enclosed with a plurality of aramid cords 31 as they are disposed on the periphery, or outside, of the bead's cross section which defines the outer circumference of the steel cords 32.

Figure 3:
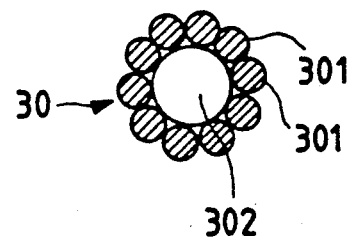
FIG. 3 is an enlarged cross section of a tire bead according to a second embodiment of the present invention.

FIG. 3 is an enlarged cross section of a tire bead according to a second embodiment of the present invention. As shown, the tire bead generally indicated by 30 is formed in a generally circular cross section in such a way that a single large-diameter steel cord 302 is disposed in the center area, or inside, of the cross section of the tire bead whereas it is enclosed with a plurality of aramid cords 301 as they are disposed on the outer periphery of the steel cord 302, or on the outside of the cross section of the tire bead.

In accordance with the constitutions described above, the aromatic polyamide wires which form the aramid cords have comparable strength to the steel wire which form the steel cords and yet the former are lighter in weight than the latter. This contributes to realizing a lighter tire without compromising its strength.

In addition, the steel cords are placed inside a cross section of the tire bead whereas the soft aramid cords are placed outside said bead cross section. As a result, the carcass cords in the carcass which is folded towards the outside around the tire bead will not make contact with the steel cords, thereby preventing the occurrence of broken carcass cords.

Further, the steel cords placed in the center area of the cross section of the bead increases its rigidity by a sufficient amount to prevent it from being deformed.

Having the construction described on the foregoing pages, the tire bead of the present invention offers the following advantages.

First, the aromatic polyamide wires have comparable strength to the steel wires and yet the former are lighter in weight than the latter. This contributes to realizing a lighter tire without compromising its strength.

Second, the steel wire cords are placed inside a cross section of the tire bead whereas the soft aromatic polyamide wire cords are placed outside said bead cross section. As a result, the carcass cords in the carcass which is folded toward the outside around the tire bead will not make contact with the steel wire cords, thereby preventing the occurrence of broken carcass cords.

Third, the steel wire cords placed in the center area of the cross section of the bead increases its rigidity by a sufficient amount to prevent it from being deformed.

Other embodiments of the present invention are described below with reference to the accompanying drawings.

Figure 4:
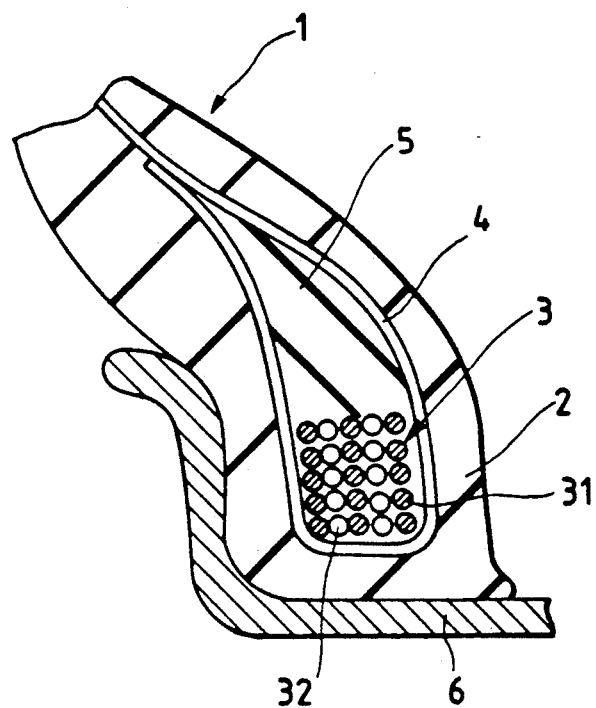
FIG. 4 is a cross section of a bead portion according to a third embodiment of the present invention.

FIG. 4 shows in partial cross section a bead portion according to a third embodiment of the present invention. As shown, a sidewall 1 extends from each end of an annular tread (not shown) formed on the outer periphery of a pneumatic tire. A bead portion 2 is formed at the radially inner end of the sidewall 1, and the tire bead indicated by 3 is embedded in annular form within the bead portion 2.

A carcass 4 is provided in such a way that it passes through the annular tread and the sidewall 1 and the end of the carcass 4 is folded towards the outside around the tire bead 3. A bead apex 5 is provided radially outward of the tire bead 3, and the bead portion 2 is fitted on a tire mounting rim 6.

The tire bead 3 is formed of aromatic polyamide wire cords (hereunder referred to as "aramid cords") 31 that are bundled together with steel wire cords (hereunder referred to as "steel cords") 32.

Figure 5:
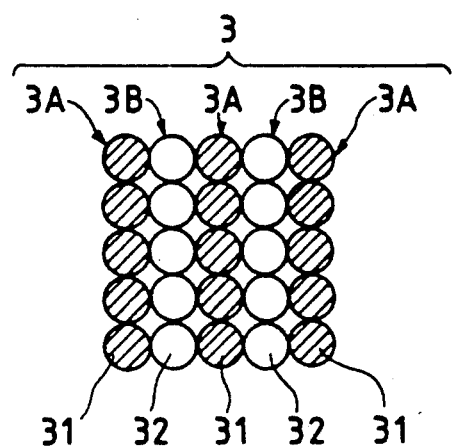
FIG. 5 is a cross section of the tire bead in the same bead portion.

FIG. 5 is a cross section of the tire bead 3. As shown, a plurality of aramid cords 31 are arranged parallel to one another to form an aramid cord layer 3A whereas a plurality of steel cords 32 are arranged parallel to one another to form a steel cord layer 3B, and the aramid cord layer 3A alternates with the steel cord layer 3B along the rotating axis of tire so as to form the tire bead 3.

Figure 6:
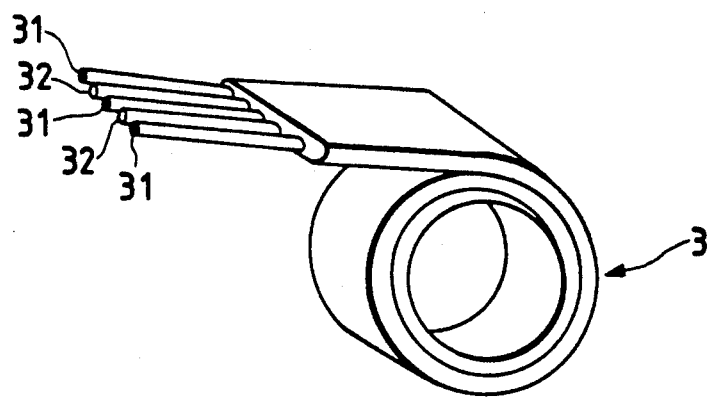
FIG. 6 shows the process sequence for fabricating the tire bead of FIG. 5.

The tire bead 3 having this cord arrangement can be produced by the method shown in FIG. 6, according to which aramid cords 31 that alternate coextensively with steel cords 32 are aligned and rolled about themselves in such a way that a predetermined number of cord plies are placed in superposition.

Figure 7:
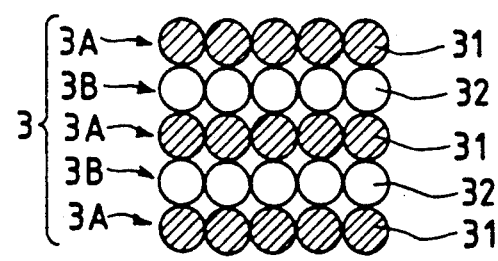
FIG. 7 is a cross section of a tire bead according to a fourth embodiment of the present invention in which the cord layers are arranged in a different way than shown in FIG. 5.

FIG. 7 is a cross section of a tire bead according to a fourth embodiment of the present invention in which cord plies are arranged in a different way than in the case shown in FIG. 5. As shown, the aramid cord layer 3A alternates with the steel cord layer 3B in the radial direction of the tire so as to form the tire bead 3.

Figure 8:
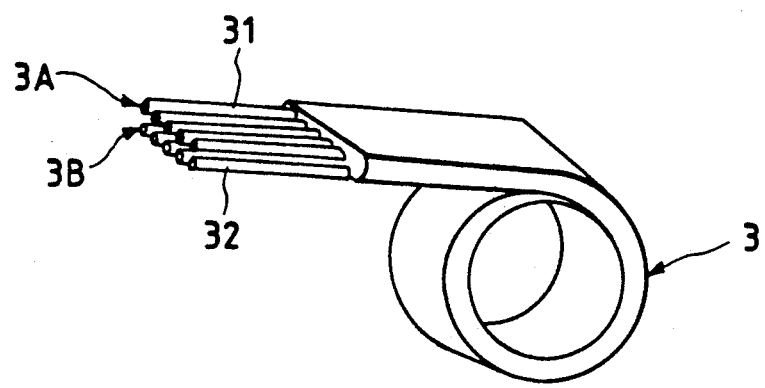
FIG. 8 shows the process sequence for fabricating the tire bead of FIG. 7.

The tire bead 3 having this cord arrangement can be produced by the method shown in FIG. 8, according to which the aramid cord layer 3A made of aramid cords 31 and the steel cord layer 3B made of steel cords 32 are superposed on each other and rolled about themselves in such a way that a predetermined number of cord plies are placed in superposition.

In accordance with the constitutions described above, the aromatic polyamide wires have comparable strength to the steel wires and yet the former are lighter in weight than the latter. This contributes to realizing a lighter tire without compromising its strength.

In addition, the aramid cord layer 3A made of aramid cords 31 is disposed in such a way that it alternates with the steel cord layer 3B made of steel cords 32 and this arrangement is not only effective in insuring the rigidity of the tire bead and preventing it from being deformed but also instrumental for facilitating the bead production.

Further, by disposing the aramid cord layer 3A at opposite ends in either the axial or radial direction of tire as in the embodiments described above, the contact between steel cords 32 and the carcass 4 is sufficiently reduced to suppress the occurrence of broken carcass cords.

Having the construction described on the foregoing pages, the tire bead of the present invention offers the following advantages.

First, the aromatic polyamide wires have comparable strength to the steel wires and yet the former are lighter in weight than the latter. This contributes to realizing a lighter tire without compromising its strength.

Second, the layer formed by arranging a plurality of aromatic polyamide wire cords parallel to one another (i.e., the aramid cord layer) is disposed in such a way that it alternates with the layer formed by arranging a plurality of steel wire cords parallel to one another, and this is not only effective in insuring the rigidity of the tire bead and preventing it from being deformed but also instrumental for facilitating the bead portion.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An annular tire bead comprising a plurality of steel wire cords and a plurality of aromatic polyamide wire cords, said steel wire cords being arranged parallel to one another to form a plurality of layers of said steel wire cords and said aromatic polyamide wire cords being arranged parallel to one another to form a plurality of layers of said aromatic polyamide wire cords, such that said layers of steel wire cords alternate with said layers of said aromatic polyamide wire cords to form said tire bead, such that layers formed by said aromatic polyamide wire cords are disposed at opposite ends of said matrix in either an axial direction or a radial direction of said tire bead.

* * * * *